C. T. Merry & M. A. Dunton.
Corn Planter.

No. 117910. Patented Aug. 8 1871.

Witnesses:
Cha. Kenyon
Villette Anderson

Inventor:
C. T. Merry,
M. A. Dunton,
Chipman Hosmer & Co.
Attys 117,910

UNITED STATES PATENT OFFICE.

CHARLES T. MERRY AND MARLIN A. DUNTON, OF NORWALK, OHIO.

IMPROVEMENT IN CORN-PLANTERS.

Specification forming part of Letters Patent No. 117,910, dated August 8, 1871.

*To all whom it may concern:*

Be it known that we, CHARLES T. MERRY and MARLIN A. DUNTON, of Norwalk, in the county of Huron and State of Ohio, have invented a new and valuable Improvement in Corn-Planters; and we do hereby declare that the following is a full, clear, and exact description of the construction and operation of the same, reference being had to the annexed drawing making a part of this specification, and to the letters and figures of reference marked thereon.

Figure 1:
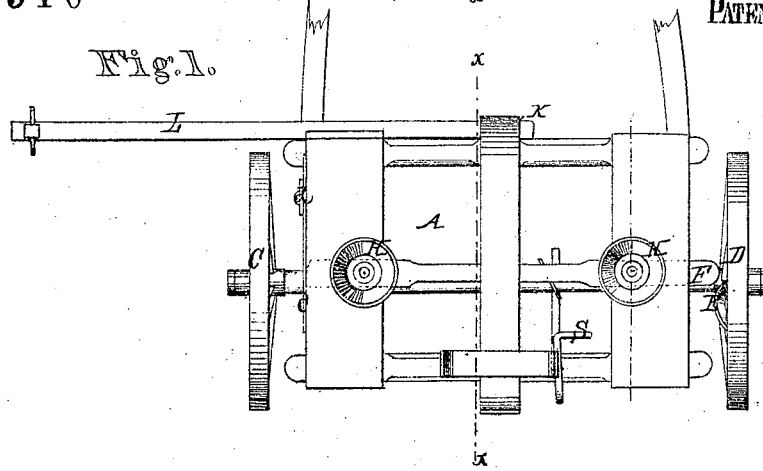
Figure 2:
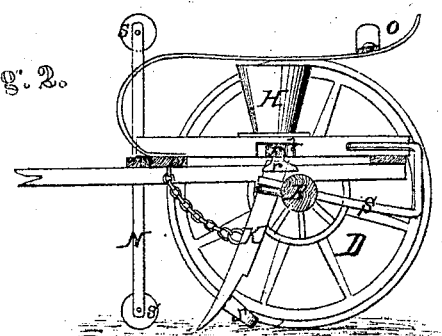
Figure 4:
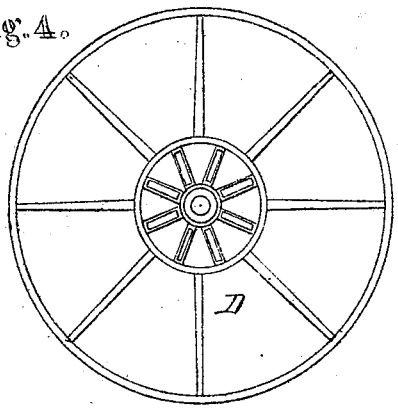
Figure 3:
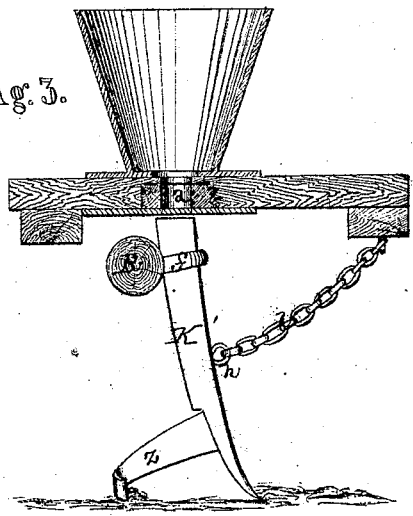

Figure 1 of the drawing is a plan view of our invention. Fig. 2 is a longitudinal vertical section taken through the line $x\ x$. Figs. 3 and 4 are details.

The nature of our invention consists in the construction and novel arrangement of a corn-planter, as will be hereinafter fully set forth.

In order to enable others skilled in the art to which our invention appertains to make and use the same, we will now proceed to describe its construction and operation, referring to the annexed drawing.

A represents the frame of our machine, having suitable journal-boxes, in which is placed the axle B. C and D are the driving-wheels. To the wheel D is attached a cam, E, designed to strike at equal distances apart against the sliding bar hereafter described, for the purpose of automatically dropping the corn or seed and regulating the distance between the hills. As the wheel revolves the cam E is brought in contact with the end of the sliding bar F, which is provided with suitable openings near each end sufficiently large for kernels of corn or grain to pass through. By this dropping mechanism the corn is allowed to pass through the conduit-tubes to the soil. Fig. 4 represents the inner side of the driving-wheel for operating and regulating the distance of the hills. The wheel is provided with an inner circle between the hub and spokes, in which circle is a series of slotted arms. In these slots it is designed to attach buttons or projections, each being provided with a thumb-screw, so that any desired number can be used to operate the drop by sliding those not required up or down out of connection. F represents the slide-bar with its openings $a$ passing through grooves $b$ in frame A, and so arranged that when the cams on the wheel push the bar and drop the corn into the hollow stem of the openers it is immediately driven back by means of a spring, $c$, fastened to the side of the frame at $d$. H H' represent seed-boxes, one on each side of the frame, with openings through the bottom of each for the purpose of allowing the corn or seed to pass downward. K K' represent hollow or tubular openers fastened to the rotating axle B by means of staples $f$. About the middle of each tube is attached an eye, $h$, and to this eye is fastened a chain, $i$, extending to the front end of the frame, as shown on the drawing in Figs. 2 and 3. The object is to hold the plows securely adjusted in the proper position for use. In rear of the openers and attached to their tubular stems are the curved scrapers Z Z, designed to cover the corn or seed deposited by the tubes with loose soil. L represents a reversible marker to mark the land for the next row, so that the rows may be at an equal distance apart throughout their whole length. This marker is pivoted to the middle of the bar at $k$ by means of a screw or bolt, so that the said marker may be easily and readily turned from one side to the other. To the outer end of the horizontal bar of the marker is attached a vertical bar, N, and to the ends of this bar are secured small wheels $s$, by which the ground is marked. There are projections extending from the frame in front for the purpose of supporting the stem of the marker in horizontal position, as shown in the drawing. O designates the driver's seat. S represents a lever used in raising the tubes, and at the same time, in connection with the cam $r$ on the sliding bar, for the purpose of throwing back the slide-bar when traveling to and from the field.

Having thus fully described our invention, what we claim as new, and desire to secure by Letters Patent, is—

In a corn-planter, the construction and arrangement of the slotted wheel D, cams E, bar F, spring $c$, lever S, openers K', cam $r'$, and markers L, substantially as specified.

In testimony that we claim the above we have hereunto subscribed our names in the presence of two witnesses.

CHARLES T. MERRY.
MARLIN A. DUNTON.

Witnesses:
ETHAN A. PRAY,
WILLIAM L. DEWITT.